United States Patent
Lee

(10) Patent No.: US 7,933,898 B2
(45) Date of Patent: Apr. 26, 2011

(54) METHOD AND SYSTEM FOR SELECTING INFORMATION OF ADVERTISER IN INTERNET SEARCH ENGINE IN RESPONSE TO SEARCH-ORDERING OF PARTNER-SITE

(75) Inventor: Woo Sung Lee, Seoul (KR)

(73) Assignee: NHN Business Platform Corporation, Seongnami-si (KR)

( * ) Notice: Subject to any disclaimer, the term of this patent is extended or adjusted under 35 U.S.C. 154(b) by 254 days.

(21) Appl. No.: 11/573,395

(22) PCT Filed: Aug. 31, 2005

(86) PCT No.: PCT/KR2005/002880
§ 371 (c)(1),
(2), (4) Date: Feb. 7, 2007

(87) PCT Pub. No.: WO2006/025694
PCT Pub. Date: Mar. 9, 2006

(65) Prior Publication Data
US 2007/0198490 A1    Aug. 23, 2007

(30) Foreign Application Priority Data
Aug. 31, 2004  (KR) ........................ 10-2004-0068830

(51) Int. Cl.
*G06F 17/30* (2006.01)
(52) U.S. Cl. ....................................... 707/723; 707/706
(58) Field of Classification Search .................. 707/3, 5, 707/9, 706, 723; 705/14, 37
See application file for complete search history.

(56) References Cited

U.S. PATENT DOCUMENTS

| | | | |
|---|---|---|---|
| 2001/0051940 A1* | 12/2001 | Soulanille | 707/3 |
| 2002/0010757 A1* | 1/2002 | Granik et al. | 709/218 |
| 2004/0093327 A1* | 5/2004 | Anderson et al. | 707/3 |
| 2005/0144065 A1* | 6/2005 | Calabria et al. | 705/14 |
| 2005/0289120 A9* | 12/2005 | Soulanille et al. | 707/3 |

FOREIGN PATENT DOCUMENTS

| | | |
|---|---|---|
| KR | 2001-45594 | 6/2001 |
| KR | 2003-4204 | 1/2003 |
| KR | 2004-83249 | 10/2004 |
| WO | WO 00/73960 | 12/2000 |

* cited by examiner

*Primary Examiner* — Vincent Boccio
*Assistant Examiner* — Thuy (Tiffany) Bui
(74) *Attorney, Agent, or Firm* — Husch Blackwell LLP

(57) ABSTRACT

A keyword advertising service method for providing search information in response to a search request, the method includes the steps of: maintaining a search information database for storing at least one search information record; receiving a search request packet including a keyword inputted in a partner site selected by a user and a site identifier for identifying the partner site, from the partner site; extracting, in response to the search request packet, at least one search information record including a keyword corresponding to the keyword included in the search request packet, from the search information database, by using the bidding participation fee; rolling the extracted search information records independently from the bidding participation fee to be displayed on a result list field and providing the result list field to the partner site in response to the search request; and charging an advertiser corresponding to the search information record, in the case the user clicks the search information record in the search result field.

6 Claims, 9 Drawing Sheets

FIG. 3

< SEARCH INFORMATION DB >

| KEYWORD | SEARCH INFORMATION | SELECTED PARTNER SITES | BIDDING PARTICIPATION FEE |
|---|---|---|---|
| REAL ESTATE | Doctor apartment<br>real estate site, lots for sale, reconstruction, complexes<br>http://www.drapt.com | naver, google, yahoo, altavista | 900WON |
| | Real estate bank<br>market price of real estate, sales, auctions, news, apartments, one-rooms, offices, real estate information<br>http://www.neonet.co.kr | naver, google, yahoo | 1,000WON |
| | Real estate serve<br>total service for real estate, lots for sale, market price of real estate, investment, auction, financial consulting service<br>http://www.serve.co.kr | naver, google, MSN | 850WON |
| | Real estate 114<br>real estate info site, market price of real estate, lots for sale, investment, communities<br>http://www.r114.co.kr | naver, yahoo, MSN | 800WON |
| | Speed bank<br>total service for multimedia real estate, investment, malls for sale, communities, market price of real estate<br>http://www.speedbank.co.kr | google, yahoo | 820WON |

METHOD AND SYSTEM FOR SELECTING INFORMATION OF ADVERTISER IN INTERNET SEARCH ENGINE IN RESPONSE TO SEARCH-ORDERING OF PARTNER-SITE

CROSS REFERENCE TO RELATED APPLICATIONS

This application is a U.S. National Phase Application of International Application PCT Application No. PCT/KR2005/002880 filed on Aug. 31, 2005, which claims the benefit of priority from Korean Patent Application No. 10-2004-0068830 filed on Aug. 31, 2004. The disclosures of International Application PCT Application No. PCT/KR2005/002880 and Korean Patent Application No. 10-2004-0068830 are incorporated herein by reference.

TECHNICAL FIELD

The present invention relates to keyword advertising method and system for providing search information in response to a search request from a partner site, and more particularly, to keyword advertising method and system which extracts search information as search results in response to a search request from a partner site and randomly displays the extracted search information on a search result list by rolling.

BACKGROUND ART

Recently, as the Internet becomes increasingly popular, information search services providing brief information on advertisers as search results in response to a query inputted in a search site by a user are actively being operated. These information search services enable an advertiser to display advertising information on his/her company to users.

Generally, to display brief information on an advertiser through information search services, the advertiser has to make a predetermined contract about search sites and keyword advertising. Thus, an advertiser who wants to display brief information via a plurality of search sites has to register and input information in every procedure for making contract, such as registration of keywords associated with display of brief information, payment of advertising cost, setting of an advertising period, and the like. This is to register keyword advertising at each search site.

In a conventional keyword advertising registration method as above, an advertiser has to take pains and make efforts while registering keyword advertising at an individual search site. Also, in the conventional keyword advertising registration method, it is not easy to manage display of brief information because of various contract conditions of keyword advertising. Thus, the management is not performed systematically.

Consequently, if there is a keyword advertising registration method which enables keyword advertising to be displayed on a plurality of search sites by performing a procedure of registering keyword advertising once, management of keyword advertising is systematized and the registration procedure thereof is also simplified. Thus, it is possible to make a more convenient keyword advertising environment.

Also, in accordance with a position where brief information of an advertiser is displayed to users in keyword advertising, the number of clicks of users with respect to brief information may be very different. Thus, an advertiser quotes a higher bidding price so that brief information on his/her company may be displayed in a better display position. Also, the advertiser has to pay a large amount of advertising cost corresponding to the bidding price. Thus, a large amount of advertising cost may act as a heavy burden to an advertiser. Furthermore, an excessive competition between advertisers to obtain a better display position may increase a bidding price. A vicious circle such as the continuous increase of a bidding price may work as an obstruction in activating keyword advertising.

Consequently, if there is a method of randomly exposing extracted brief information in response to a search request without particular standard, competition between advertisers may be reduced so as to control a rise in advertising cost and promote the activation of keyword advertising.

Accordingly, there is needed a keyword advertising model which can simplify registration procedures and systematically manage advertising while performing keyword advertising at various search sites in accordance with advertising strategies intended by an advertiser. Also, there is needed a keyword advertising model which maintains advertising effects as an advertiser desires by fairly offering an advertising opportunity and performs economic keyword advertising by calculating reasonable advertising cost.

DISCLOSURE OF INVENTION

Technical Goals

To solve the aforementioned problems, the present invention provides keyword advertising service method and system which fairly assigns advertising outcomes to each search information and systematically manages advertising by determining, in response to a search request from a plurality of partner sites, a display position of extracted search information by rolling and providing the same to the partners sites.

The present invention also provides keyword advertising method and system which specifies a partner site to display search information in accordance with the arbitrary judgment of an advertiser and reduces unnecessary advertising cost by performing keyword advertising only in a partner site needed for advertising.

The present invention also provides a keyword advertising method and system which can stop excessive competition between advertisers by randomly sorting extracted search information through rolling, and calculate reasonable advertising costs by making advertising costs of all search information the same in a search result list, irrespective of its display position.

The present invention also provides a keyword advertising method and system which prevents a display position of extracted search information from being monopolized by particular search information by controlling the display position of the search information according to a search request from a partner site not to be consecutively determined.

TECHNICAL SOLUTIONS

According to an embodiment of the present invention for achieving the above objectives, there is provided a keyword advertising service method for providing search information in response to a search request, the method including the steps of: maintaining a search information database for storing at least one search information record; receiving a search request packet including a keyword inputted in a partner site selected by a user and a site identifier for identifying the partner site, from the partner site; extracting, in response to the search request packet, at least one search information record including a keyword corresponding to the keyword included in the search request packet, from the search information database by using the bidding participation fee; rolling the extracted search information records independently from the bidding participation fee to be displayed on a result list field and providing the result list field to the partner site in response to the search request; and charging an advertiser corresponding to the search information record, in the case the user clicks the search information record in the search result field.

Also, for a technical configuration for achieving the above objectives, there is provided a keyword advertising system for providing search information of an advertiser in response to a search request, the system including: a search information database for storing at least one search information record; an interface unit receiving a search request packet including a keyword inputted in a partner site selected by a user and a site identifier for identifying the partner site from the partner site; an information extraction unit extracting in response to the search request packet, at least one search information record including a keyword corresponding to the keyword included in the search request packet, from the search information database, by using the bidding participation fee; an information providing unit rolling the extracted search information records independently from the bidding participation fee to be placed on a result list field and providing the result list field to the partner site in response to the search request; and a payment control unit charging an advertiser corresponding to the search information record, in the case the user clicks the search information record in the search result field.

BRIEF DESCRIPTION OF DRAWINGS

FIG. 3 is a diagram illustrating an example of a configuration of a search information database according to the present invention.

BEST MODE FOR CARRYING OUT THE INVENTION

Hereinafter, keyword advertising service method and system will be described with reference to the accompanying drawings.

A partner site continuously used in the present specification may be at least one search service site providing search information associated with an advertiser in response to a search request generated when a user inputs a keyword. Namely, the partner site is a search site contracted or linked to receive search results about a search request from a keyword advertising service system, such as 'Naver', 'Yahoo!', 'Google', and the like, illustrated in FIG. 3.

Also, rolling indicates the process of randomly determining an order of search information to be displayed on a search result list, so that a display position of particular search information to be extracted as search results changes whenever a new search request is generated. Through rolling, it is possible to provide search information displayed on a new display position for each new search result whenever the same keyword is inputted, irrespective of a partner site having generated a search request.

Also, search information may be one item of search results that is extracted in correspondence to a keyword inputted in a search site and provided to a user who has requested a search. One search information may include a keyword causing extraction of the search information, a network address of a website associated with an advertiser, an advertiser identifier for identifying an advertiser, brief information on a website operated by an advertiser such as the title of contents, a summary thereof, a network address thereof, and the like. For example, in FIG. 3, one extracted search information corresponding to the keyword 'real estate' includes a title of contents such as "doctor apartment", a network address such as "http://www.drapt.com", a summary of contents, and the like. Also, a search result list is, in response to a search request, search results provided to a partner site having generated the search request, and may indicate a list of search information displaying at least one search information on a display position determined by the rolling.

Figure 1:
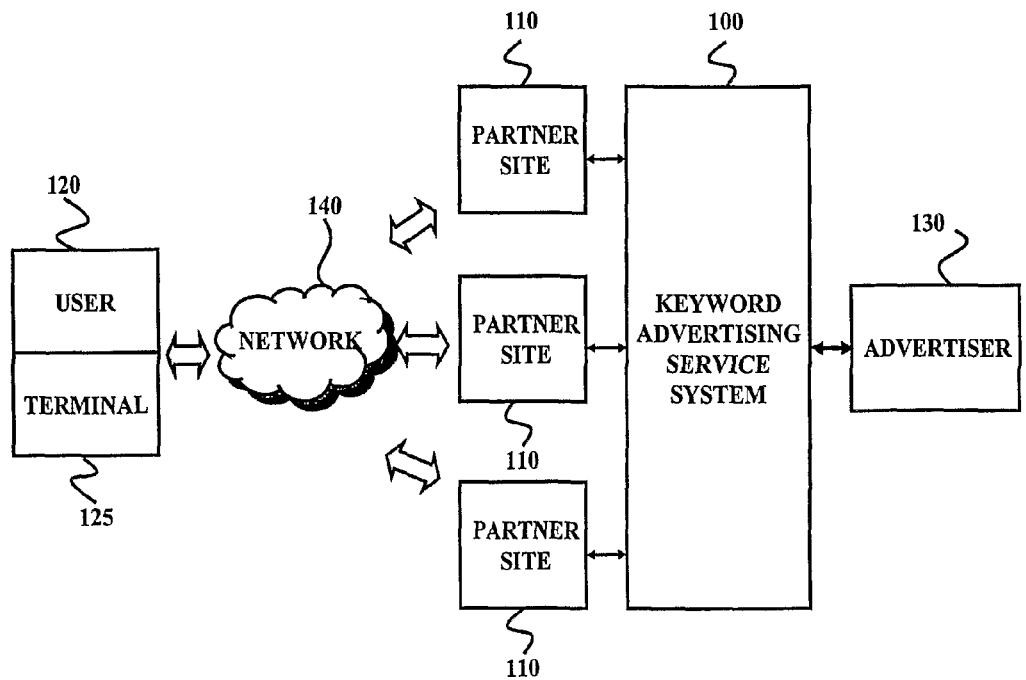
FIG. 1 is a diagram for explaining a schematic configuration of a keyword advertising service system of the present invention.

FIG. 1 is a diagram for explaining a schematic configuration of a keyword advertising service system of the present invention.

A keyword advertising service system 100 is a device for searching and extracting a predetermined number of search information in correspondence to a keyword inputted in at least one partner site for a search request, and randomly exposing the extracted search information by rolling and providing the displayed search information to the partner site having generated the search request. For this, the keyword advertising service system 100 maintains a predetermined contract with said at least one search site with respect to providing search information.

A partner site 110 functions to receive a keyword from a user 120 for a search request and to display search information to the user 120 in correspondence to the inputted keyword. The search information is received from the keyword advertising service system 100 of the present invention. Namely, the partner site 110 is a search program or a search web server supporting searching operation to help the user 120 to easily access a website holding contents the user 120 desires. In particular, besides the search information, the partner site 110 can provide various result information generated at the partner site 110 itself to the user 120 in response to the search request. In this instance, search information or various result information provided from the partner site 110 includes predetermined link information, such as a network address associated with an advertiser. In the case the user 120 clicks search information or result information displayed on a terminal 125 by using a command input tool, such as a mouse, the partner site 110 enables an access between an advertiser 130 associated with search information or result information and the user 120 who has generated the click. The partner site 110 may be categorized as word-oriented searching by inputting a keyword and as subject-oriented searching by selecting a set directory in accordance with a searching method. In the present specification, to perform the objectives of the present invention to randomly sort and display extracted search information corresponding to an inputted keyword, the searching method of the partner site 110 is limited to word-oriented searching.

The user 120 may be an Internet user who has the terminal 125 access the partner site 110, and generates a search request by inputting a keyword in the partner site 110.

The advertiser 130 may be a Content Provider (CP) who operates a website designated on a network by a network address such as an IP address, a URL, a domain, etc. Also, the advertiser 130 registers keyword advertising about a particular keyword to the keyword advertising service system 100 of the present invention, so that search information on the advertiser 130 or his/her company may be provided to the user 120 in response to a search request by inputting of a corresponding keyword into the partner site 110. Also, the advertiser 130 may pay advertising cost generated in accordance with the user's 120 click on search information to a system operator according to the present invention.

The terminal 125 is a device for maintaining a connection state with the partner site 110 via a network 140 and displaying at least one search information (or a search result list exposing search information through rolling) received from the keyword advertising service system 100 on a search screen. The terminal 125 may be a general concept for terminals provided with a predetermined computation function by mounting a predetermined microprocessor and equipping a predetermined memory means, such as, personal computers, handheld computers, PDAs (Personal Digital Assistants), MP3 players, electronic dictionaries, cellular phones, smart phones, and the like.

In association with the display of search information on the partner site 110, the keyword advertising service system 100 displays at least one search information on a search result list by rolling and provides the user 120 with the search result list. In particular, the keyword advertising service system 100 charges advertising cost to the advertiser 130 in accordance with the user 120's click on search information. Thus, it is possible to calculate reasonable advertising cost and charge a fair bill. Hereinafter, the precise configuration of a keyword advertising service system 200 of the present invention will be described with reference to FIG. 2.

Figure 2:
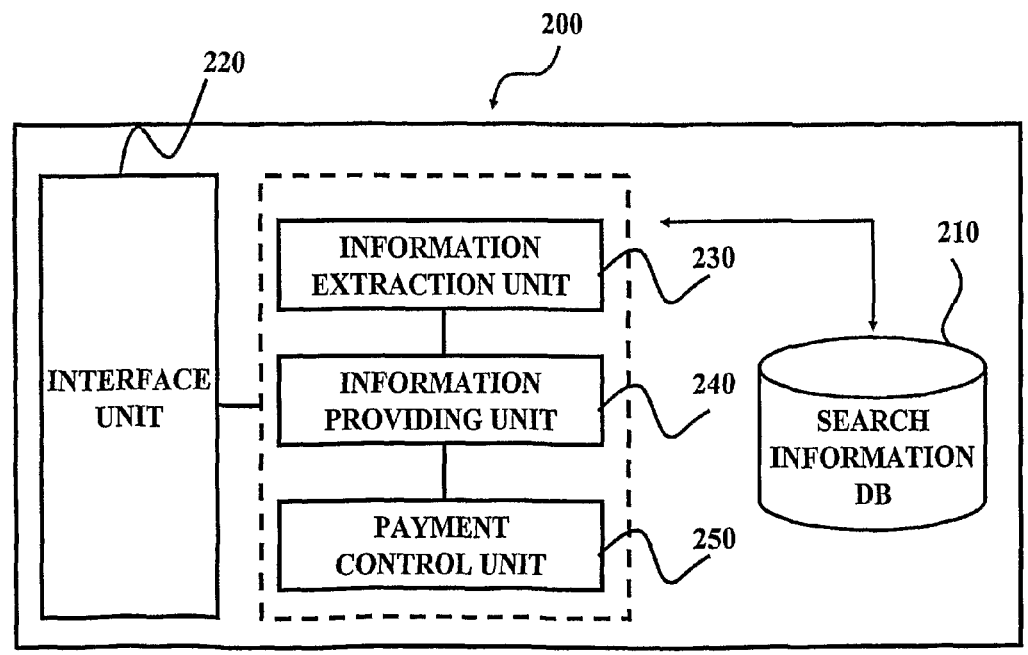
FIG. 2 is a configuration diagram illustrating a keyword advertising service system according to an exemplary embodiment of the present invention.

FIG. 2 is a configuration diagram illustrating the keyword advertising service system 200 according to an exemplary embodiment of the present invention.

The keyword advertising service system 200 includes a search information database 210, an interface unit 220, an information extraction unit 230, an information providing unit 240, and a payment control unit 250.

The search information database 210 is a unit for storing at least one search information record. The search information database 210 functions to store at least one search information associated with the advertiser 130 corresponding to a predetermined keyword. Namely, the search information database 210 functions to record and maintain search information records. The search information record is generated by associating search information of the advertiser 130 with a keyword inputted by the advertiser 130 to register keyword advertising. In this instance, the search information record includes at least one selected from the group consisting of a keyword inputted from the advertiser 130, a network address of a website associated with the advertiser 130, brief information on the website identified by the network address, an advertiser identifier for identifying the advertiser 130 associated with the search information record, information on a partner site selected by the advertiser 130 among a plurality of partner sites, and a bidding participation fee. In particular, a keyword inputted for registration of keyword advertising may be arbitrarily selected by each advertiser 130. The search information database 210 may classify and store search records of the advertisers 130 who have inputted an identical keyword. Through this, it is possible to expeditiously and precisely identify all search records corresponding to an inputted keyword for a search request (see FIG. 3).

The interface unit 220 is a unit for receiving a search request packet including a keyword inputted in a partner site selected by a user and a site identifier for identifying the partner site, from the partner site. The interface unit 220 functions to receive a partner site having generated a search request and a keyword inputted in the partner site. Through this, the keyword advertising service system 200 of the present invention can recognize a search information record of the advertiser 130 who allows the partner site having generated the search request to extract search information.

Also, the interface unit receives information on a bidding participation fee from the advertiser 130 in association with extraction of a search information record. In this case, the bidding participation fee is a betting value involved in extraction of search information. Thus, the bidding participation fee may be a standard to allow particular search information to be preferentially extracted in association with a search request. In the case search information provided to the user 120 is clicked by the user 120 using an command input tool, the bidding participation fee may be used for calculating advertising cost to be charged to the advertiser 130.

The bidding participation fee may include cost per click according to a one-time click of the user 120 with respect to search information, cost per display according to providing of a search result list to the user 120, cost per purchase according to the successfully completed purchase by the user 120 who has been connected to the advertiser 130 via a click of search information, and the like. Hereinafter, for convenience of description, it will be described that cost per click is set as the bidding participation fee. For example, in the case the user 120 clicks particular search information displayed on a search result list by rolling, the keyword advertising service system 200 of the present invention may charge advertising cost generated by using cost per click of the search information to the advertiser 130 of the search information. In the present embodiment, it will be described that a predetermined condition is set such that lowest cost per click is determined as advertising cost among costs per click (bidding participation fee) associated with search information displayed in a search result list.

Hereinafter, selected partner site information and a bidding price fee are associated with each search information corresponding to a predetermined keyword will be described with reference to FIG. 3.

FIG. 3 is a diagram illustrating an example of a configuration of a search information database according to the present invention.

As noted above, the search information database 210 stores at least one search information corresponding to a particular keyword, selected partner site information associated with each search information, and information on a bidding participation fee associated with each search information. Accordingly, in the case of receiving a search request packet, the keyword advertising service system 200 of the present invention identifies at least one search information corresponding to an inputted keyword from the search information database 210. In this instance, the keyword advertising service system 200 selectively identifies search information recording a site identifier included in the search request packet as selected partner site information. The selected partner site information and the bidding participation fee are inputted when the advertiser 130 initially registers keyword advertising and may be continuously renewed under a predetermined condition in accordance with the arbitrary judgment of the advertiser 130.

In the case information recorded in the search information database 210 is just like FIG. 3, it is supposed that the user inputs a keyword 'real estate' in a partner site 'naver'. In this case, the partner site 'naver' may generate a search request packet including the keyword 'real estate' and a site identifier 'naver'. The keyword advertising service system 200 receives the search request packet and identifies, among search information corresponding to the keyword 'real estate', search information of 'doctor apartment', 'real estate bank', 'real estate serve', and 'speed bank' as targets for extraction. The identified search information maintains the site identifier 'naver' as selected partner site information.

The information extraction unit 230 is a unit for extracting, in response to the received search request packet, at least one search information record including a keyword corresponding to the keyword included in the search request packet, from the search information database 210 by using the bidding participation fee. That is, the information extraction unit 230 functions to extract at least one portion of search information corresponding to an inputted keyword for a search request. Also, the information extraction unit 230 functions to extract a predetermined number of search information as search results, in response to a search request of the user 120 using the partner site 110. In the present embodiment, the information extraction unit 230 determines a predetermined number of search information from at least one search information identified by a search request packet. The predetermined number of search information is determined by comparing the bidding participation fee which is associated with each search information.

The information providing unit 240 is a unit for rolling an extracted search information record independently from a bidding participation fee to be displayed on a result list field and in response to a search request, and providing the result list field to a partner site. Namely, the information providing unit 240 is a unit for rolling a predetermined number of search information to be displayed on a search result list and providing the search result list to a partner site having generated a search request. In this instance, the search result list may be results of the search request to sort and display each extracted search information record on a search screen in accordance with a display position determined by rolling. Generally, a display position on a search result list may cause some different reaction when the user 120 recognizes displayed search information records. Thus, the frequency in which the user 120 clicks a search information record and connects to the advertiser 130 may be different. Accordingly, in the present embodiment, the rolling determines a display position of a search information record and controls a particular search information record not to be consecutively positioned in the same display position that had been determined in the previous search request. Through this, well-balanced advertising effect may be brought to all extracted search information records. In response to a search request from the user 120, a search result list exposing search information records through the rolling as above is displayed on the user 120's terminal 125 as search results. Hereinafter, extraction of search information records and display thereof on a search result list will be described with reference to FIGS. 4 and 5.

Figure 4:
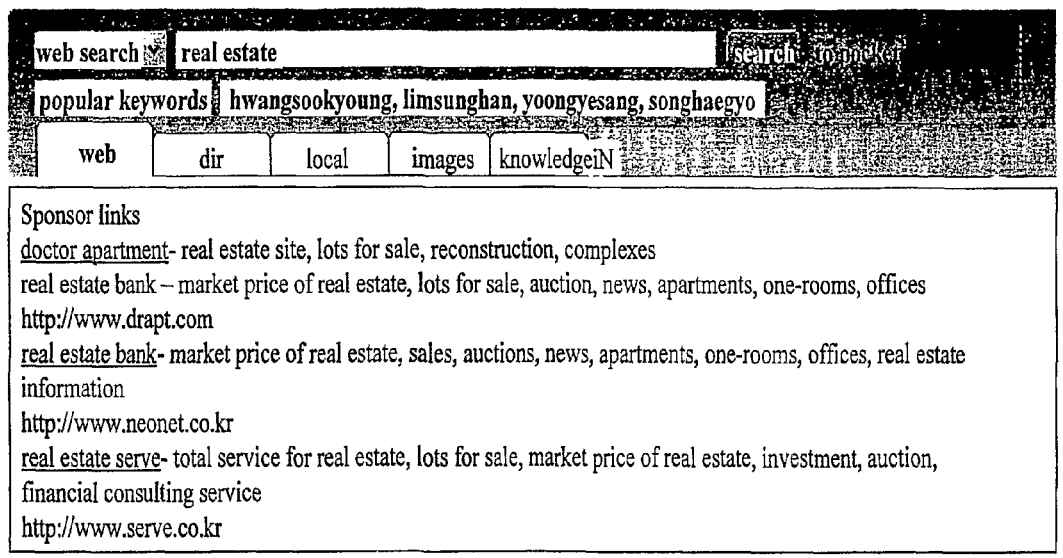
FIGS. 4 and 5 are diagrams for explaining an example of a search result list provided as search results in response to a search request from a partner site.
Figure 5:
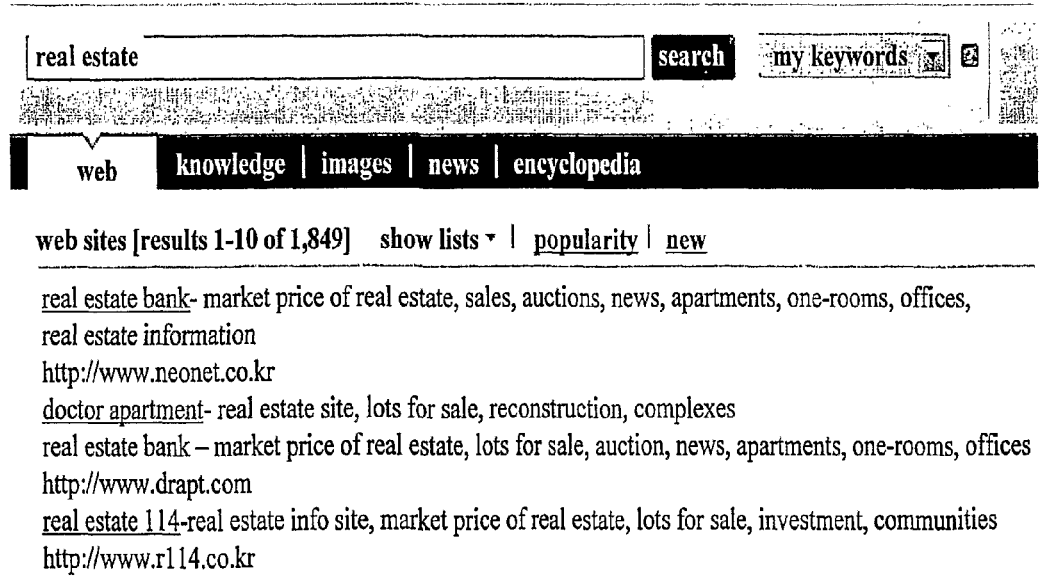

FIGS. 4 and 5 are diagrams for explaining an example of a search result list provided as search results in response to a search request from a partner site.

Hereinafter, in FIGS. 4 and 5, for convenience of description, it is exemplified that the user 120 inputs the keyword 'real estate' in different partner sites 'naver' and 'yahoo', and that the number of searched search information records is set as 3. In this instance, there is no particular constraint on the point in time when the keyword is inputted in each partner site. Thus, it makes no difference whether the keyword is inputted simultaneously or differently into different partner sites.

In the case the keyword 'real estate' is inputted in the partner site 'naver', the keyword advertising service system 200 of the present invention selects search information records, 'doctor apartment', 'real estate bank', 'real estate serve', and 'real estate 114' associated with the 'real estate' and 'naver' as targets for extraction from the search information database 210 of FIG. 3 in accordance with a search request packet. Also, the keyword advertising service system 200 determines search information records, 'real estate bank', 'doctor apartment', and 'real estate serve' associated with a comparatively higher bidding participation fee by using bidding participation fees of the search information records selected as targets for extraction. The determined search information records are displayed on a search result list at random by rolling. The keyword advertising service system 200 provides the search result list on the partner site 'naver' as search results, as illustrated in FIG. 4.

On the other hand, in the case the keyword 'real estate' is inputted in the partner site 'yahoo', the keyword advertising service system 200 selects search information records, 'real estate bank', 'doctor apartment', 'real estate 114', and 'speed bank', from the search information database 210 in accordance with a search request packet associated with the 'real estate' and 'yahoo'. The determined search information records are displayed on a search result list at random by rolling. The keyword advertising service system 200 provides the search result list on the partner site 'yahoo' as search results, as illustrated in FIG. 5.

In this instance, the rolling may be controlled such that the search information records, 'real estate bank' and 'doctor apartment' commonly extracted by the keyword 'real estate' may be displayed on a different position of the search result lists. Through this, it is possible to prevent the unbalance of advertising effects occurring when either search information record 'real estate bank' or 'doctor apartment' keeps occupying one display position.

The payment control unit 250 is a unit for controlling a bill to be charged to the advertiser 130 corresponding to a search information record, in the case the user 120 clicks the search information record in a result list field. The payment control unit 250 according to the present embodiment determines advertising cost as the same with respect to search information records provided on a search result list. At this time, the advertising cost is calculated in accordance with characteristic of the keyword advertising service system 200 rolling search information records to be displayed on a result list field. This is because a display position of a search information record on a result list field changes for each generation of a search request. Also, since the rolling makes advertising outcomes resulted from each information record the same, it is reasonable to equally calculate advertising cost with respect to search information records provided on one result list field. Calculation of advertising cost may be dynamically determined by an operator of the present system who considers various system environments. For example, a minimal size may be determined as advertising cost among bidding participation fees of search information records provided on a search result field (case 1). Or, a maximal size may be determined as advertising cost among bidding participation fees of search information records not extracted as search results (case 2). In the case the user 120 clicks a search information record on the result list field of FIG. 4, calculated advertising cost, in the case of case 1, may be determined as '850 won' of search information record 'real estate serve' whose bidding participation fee is smallest. In the case of case 2, calculated advertising cost may be determined as '800 won' of search information record 'real estate 114' whose bidding participation fee is highest among search information records not extracted. Also, it is possible to calculate advertising cost in the processed form by assigning predetermined weight to the determined bidding participation fee. Accordingly, the operator of the present invention may optimally determine advertising cost through change of the size of weight. Also, it is possible to control charging of various advertising cost, such as expansion of operating profits, conservation of loss, return of profits, and the like.

Also, advertising cost of the present invention according to another embodiment of the present invention may be determined as any one of a bidding participation fee of one search information selected from search information provided on a search result list, a bidding participation fee of one search information selected from search information which corresponds to a keyword, but is not extracted, and a bidding participation fee of one search information selected from search information corresponding to a keyword. Namely, as advertising cost, the keyword advertising service system 200 of the present invention determines a bidding participation fee of search information selected on the basis of a predetermined standard from at least one search information displayed to the user 120. Or, as advertising cost, the keyword advertising service system 200 determines a bidding participation fee of search information selected on the basis of a predetermined standard from at least one search information that is stored in the search information database 210 in correspondence to a keyword, but not displayed to the user 120. Or, as advertising cost, the keyword advertising service system 200 determines a bidding participation fee of search information selected on the basis of a predetermined standard from at least one search information stored in the search information database 210 in correspondence to the keyword.

Operation flows of the keyword advertising service system 200 according to the present invention constructed as above will be described in detail.

Figure 6:
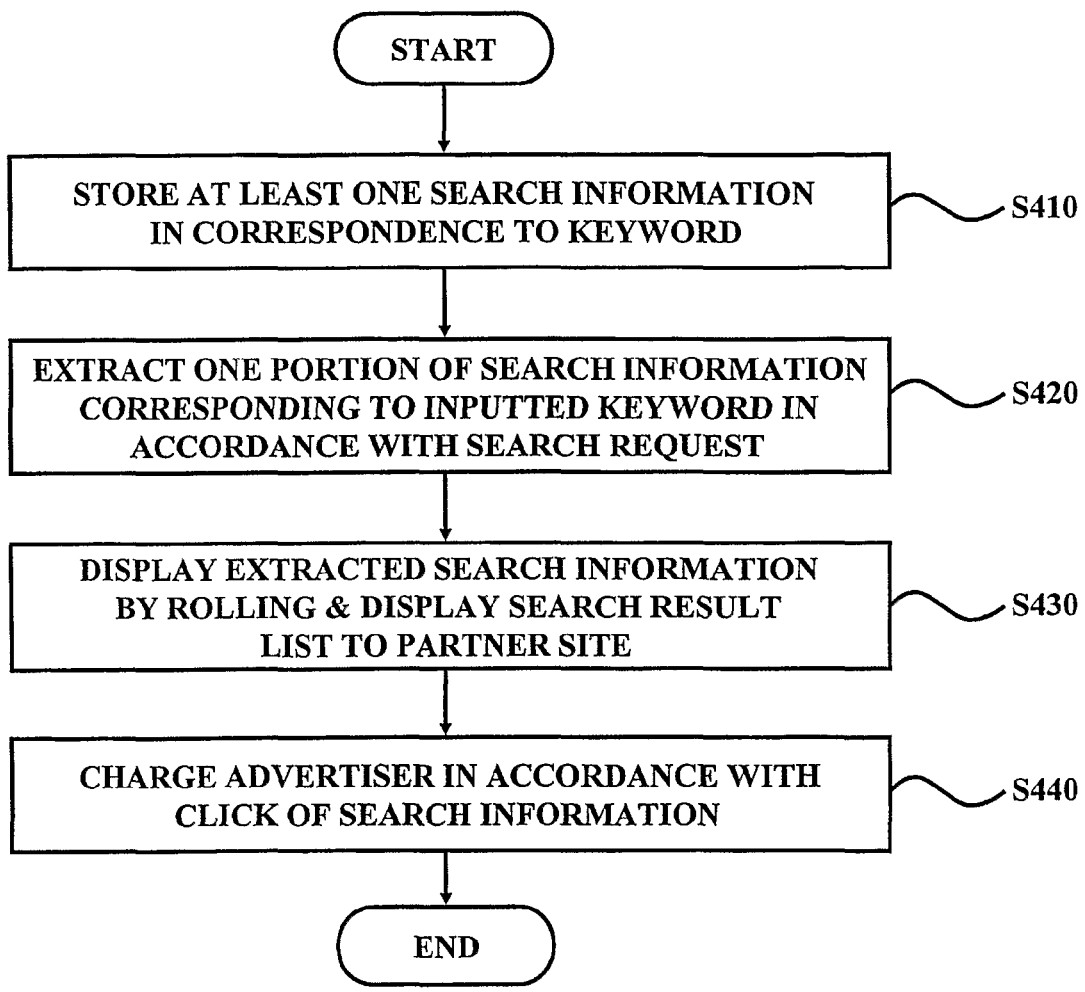
FIG. 6 is a flowchart illustrating a keyword advertising service method according to an exemplary embodiment of the present invention.

FIG. 6 is a flowchart illustrating a keyword advertising service method according to an exemplary embodiment of the present invention.

The keyword advertising service method according to the present embodiment is performed by the aforementioned keyword advertising service system 200.

In step S410, the keyword advertising service system 200 maintains the search information database 210 storing at least one search information in correspondence to a keyword. The step S410 is a procedure for grouping search information of the advertiser 130 on the basis of the keyword causing extraction of search information and storing the grouped search information in a predetermined independent recording area. Also, the search information database 210 may further record selected partner site information causing corresponding search information to be extracted as search results for each search information and information on a bidding participation fee associated with extraction of search information (see FIG. 3).

In step S420, the keyword advertising service system 200 receives a search request including a keyword inputted in the partner site 110 selected by the user 120, from the partner site 110 and extracts at least one portion of search information corresponding to the inputted keyword. The step S420 is a procedure for identifying search information of the advertiser 130 allowing search information to be extracted as search results for the partner site 110 generating a search request. Hereinafter, a selection of the advertiser 130 with respect to partner sites will be described with reference to FIG. 7.

Figure 7:
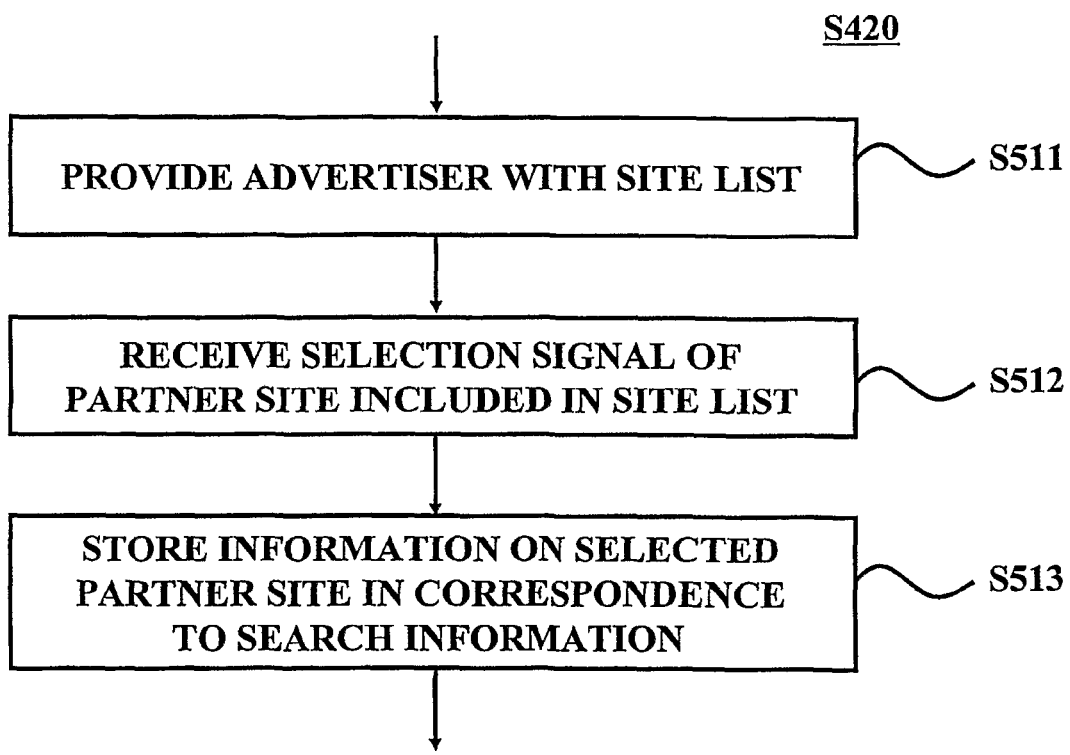
FIG. 7 is a flowchart illustrating an example of a method of selecting a partner site having allowed search information to be extracted in accordance with a search request of the present invention.

FIG. 7 is a flowchart illustrating an example of a method of selecting a partner site having allowed search information of an advertiser to be extracted in accordance with a search request of the present invention.

In step S511, the keyword advertising service system 200 provides the advertiser 130 with a site list about partner sites. The step S511 is a procedure for transmitting a list about the partner sites 110 exposing search information associated with the advertiser 130 or his/her company to the advertiser 130. As described above, the partner site 110 is a search site displaying search information of the advertiser 130 as search results in response to a predetermined search request. A site list may include information on the partner sites 110 with which the advertiser 130 maintains a contract and a selection button for receiving a selection of the user 120.

In step S512, the keyword advertising service system 200 receives a selection signal from the advertiser 130 with respect to a particular partner site included in the site list. The step S512 is a procedure for specifying a search site allowed to display search information of the advertiser 130 in accordance with the arbitrary judgment of the advertiser 130. For example, FIG. 3 shows that the advertiser 130 associated with search information 'doctor apartment' clicked a selection button associated with 'naver', 'google', 'yahoo', or 'altavista' included in the site list and generated a predetermined selection signal.

In step S513, the keyword advertising service system 200 stores information on the partner site 110 selected by the advertiser 130 in the search information database 210 in correspondence to search information of the advertiser 130. The step S513 is a procedure for recording information associated with a partner site for each search information in the search information database 210, such that search information becoming a target for extraction changes in accordance with which partner site generates a search request. Accordingly, the keyword advertising service system 200 of the present invention may extract at least one portion of search information corresponding to the inputted keyword from search information stored in the search information database 210, in the case the partner site selected by the user is the partner site selected by the advertiser. Also, the keyword advertising service system 200 may not extract search information 210 corresponding to the inputted keyword, in the case the partner site selected by the user is not the partner site selected by the advertiser. Accordingly, a partner site exposing search information may be specified in accordance with the arbitrary judgment of a relevant advertiser. Also, since keyword advertising is performed only in a partner site needed by the advertiser 130, it is possible to prevent unnecessary calculation of advertising cost.

Also, the keyword advertising service system 200 may receive a bidding participation fee as a standard for extracting search information from the search information database 210. Hereinafter, input of bidding participation fee and extraction of search information will be described with reference to FIG. 8.

Figure 8:
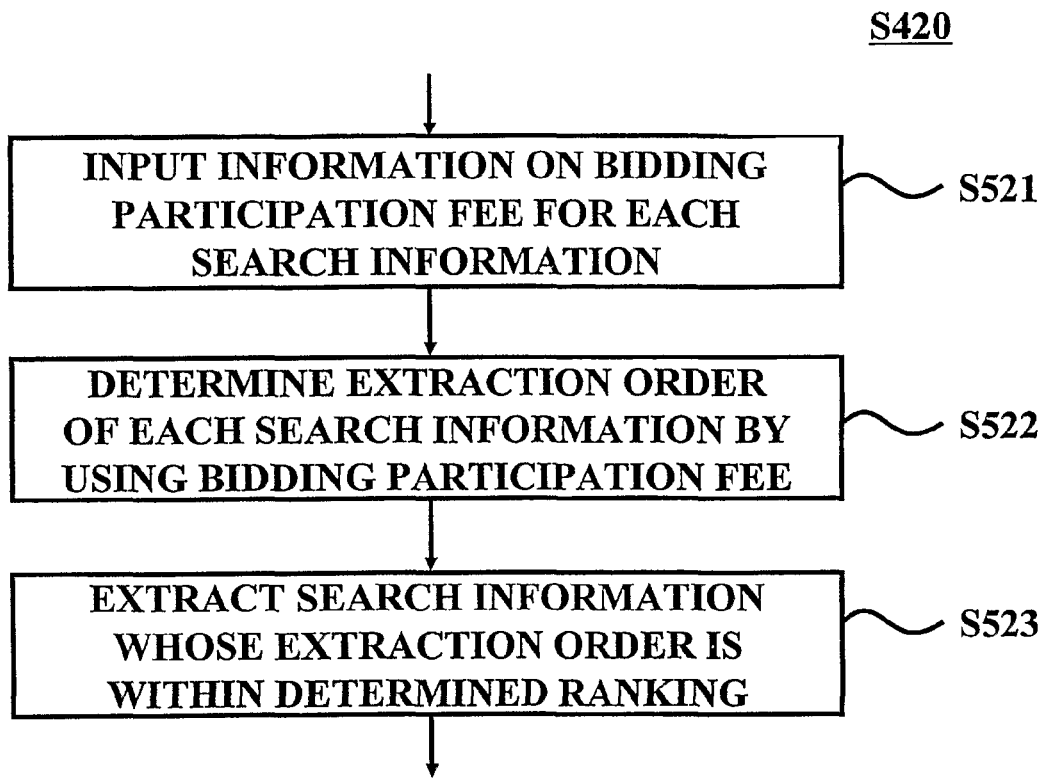
FIG. 8 is a flowchart illustrating an example of a method of determining an extraction order of search information.

FIG. 8 is a flowchart illustrating an example of a method of determining an extraction order of search information according to the present invention.

In step S521, the keyword advertising service system 200 receives information on a bidding participation fee for each search information from the advertiser 130. The step S521 is a procedure for receiving a bidding participation fee associated with calculation of advertising cost and extraction of search information from the advertiser 130 of each search information. In this instance, the inputted bidding participation fee is stored and maintained in the search information database 210 to correlate with search information (see FIG. 3). In the present embodiment, there is no particular time constraint on when a bidding participation fee has to be inputted. However, it may be preferable to allow the advertiser 130 to input a renewed bidding participation fee as necessary on the basis of an advertising period for which keyword advertising is maintained. Search information related to the bidding participation fee waits to be extracted within a predetermined advertising period. When a particular keyword is inputted from the partner site 110, corresponding search information may be extracted as search results.

In step S522, the keyword advertising service system 200 determines an extraction order of each search information by using the inputted bidding participation fee. The step S522 is a procedure for comparing bidding participation fees of extracted search information in response to a search request from the partner site 110. Namely, in the step S522, the keyword advertising service system 200 assigns an extraction order to each search information in the order of the bidding participation fee size.

In step S523, the keyword advertising service system 200 extracts search information which is within the determined extraction ranking. The step S523 is a procedure for selecting search information belonging to a set N extraction order from at least one extracted search information corresponding to an inputted keyword. In this instance, N is a natural number more than 0. Namely, in the step S523, the keyword advertising service system 200 extracts search information belonging to the N extraction order by considering the number of search information provided to the user 120 and the number of search information displayed on a search result list. Also, the set N may be dynamically determined by an operator of the present system considering an area of a search screen displaying a search result list.

Thus, according to the present invention, search information satisfying a predetermined criterion is extracted on the basis of the size of the bidding participation fee. Also, search information of the advertiser 130 who is willing to pay a higher advertising cost is extracted. Accordingly, it is possible to promote the increase of operating profits.

Referring again to FIG. 6, in step S430, the keyword advertising service system 200 displays extracted search information on a predetermined search result list by rolling and in response to a search request, provides the search result list to the partner site 110. The step S430 is a procedure for randomly determining a display position of extracted search information on a search result list. In the step S430, a search result list generated in response to a search request from the partner site 110 is displayed on the terminal 125 of the user 120 who is accessing the partner site 110 (see FIGS. 4 and 5).

In the step S430, the keyword advertising service system 200 may control the previously determined display position not to be consecutively assigned to particular search information.

Figure 9:
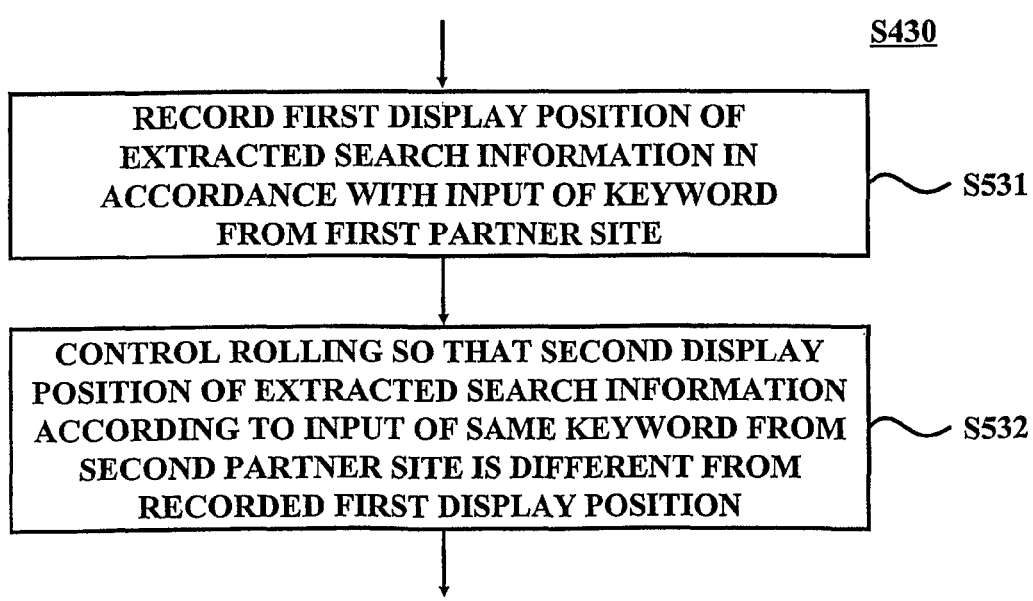
FIG. 9 is a flowchart illustrating an example of a method of controlling the same display position not to be consecutively assigned to particular search information by a record about a random ranking according to the present invention.

FIG. 9 is a flowchart illustrating an example of a method of controlling the same display position not to be consecutively assigned to particular search information through a record of random ranking according to the present invention.

In step S531, the keyword advertising service system 200 records a first display position of extracted search information in response to a keyword inputted in a first partner site. The step S531 is a procedure for storing search information extracted in response to a previously generated search request as history information. In the step S531, a display position of each search information determined by rolling is recorded. In this instance, the rolling is associated with determining whether to display search information on a search result list. For example, referring to FIG. 4, a display position of search information 'doctor apartment' is determined as a highest ranking on a search result list. The keyword advertising service system 200 may record history information on the search information 'doctor apartment' as 'display position of first grade'.

In step S532, the keyword advertising service system 200 controls the rolling so that a second display position of the same search information extracted in response to a search request by the same keyword inputted in a second partner site is different from the recorded first display position. The step S532 is a procedure for, in the case a search request is generated from the second partner site by the same keyword and in response to the search request, the search information extracted in the step S531 is extracted again, limiting a display position of the search information not to be consecutively displayed in a display position where previous history information is available. This is to prevent one particular search information from being consecutively displayed in the same display position by rolling. Through this, search information to be positioned in various display locations after each successive extraction is completed. Thus, it is possible to randomly display search information by the rolling. In the preset embodiment, there is no particular constraint on the second partner site. The second partner site is a search site which may be identical to or different from the first partner site and is under a predetermined contract. In the present embodiment, it is described that a display position of search information is controlled not to be consecutively determined as the same position. However, there may be various display methods using rolling, such as a method of completely prohibiting search information from being displayed in a display position where history information has been displayed under a predetermined condition.

Referring again to FIG. 6, in step S440, in the case the user 120 clicks search information in the search result list, the keyword advertising service system 200 charges the advertiser 130 corresponding to the search information. The step S440 is a procedure for generating advertising cost in accordance with the user's 120 click on search information. Hereinafter, generation of advertising cost according to a click of the user 120 and charging of the generated advertising cost to the advertiser 130 will be described with reference to FIG. 10.

Figure 10:
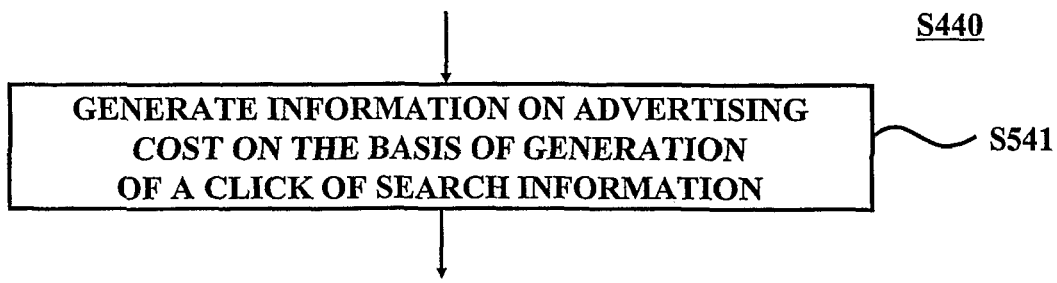
FIG. 10 is a flowchart illustrating an example of a method of generating advertising cost information in accordance with a user's click with respect to search information.

FIG. 10 is a flowchart illustrating an example of a method of generating advertising cost information in accordance with a user's click on search information.

In step S541, to generate advertising cost information, the keyword advertising service system 200 generates information on advertising cost to be charged to the advertiser 130 on the basis of a click of search information displayed on a search result list. The step S541 is a procedure for charging advertising cost to the advertiser 130 in accordance with the user's 120 click on search information. In particular, in the present embodiment, advertising cost for all search information displayed on the same search result list may be determined to be the same by a predetermined bidding participation fee. This is due to rolling of the present invention. The rolling makes a display position of extracted search information change whenever a search request is generated. For example, a minimal size may be determined as advertising cost among bidding participation fees of search information provided on a search result field. Or, a maximal size may be determined as advertising cost among bidding participation fees of search information records that corresponds to a keyword, but is not extracted. Namely, the reason one advertising cost is determined with respect to search information whose advertisers 130 are different is because of the characteristic of the present invention to not specify a display position of search information through rolling. In this instance, greater advertising cost than the bidding participation fee inputted by the advertiser 130 is not charged to the advertiser 130. Thus, economical keyword advertising service can be accomplished.

Hereinafter, as another embodiment of the present invention, it will be described that a predetermined condition for terminating advertising is established and keyword advertising is stopped in the case search information satisfies the terminating condition.

Figure 11:
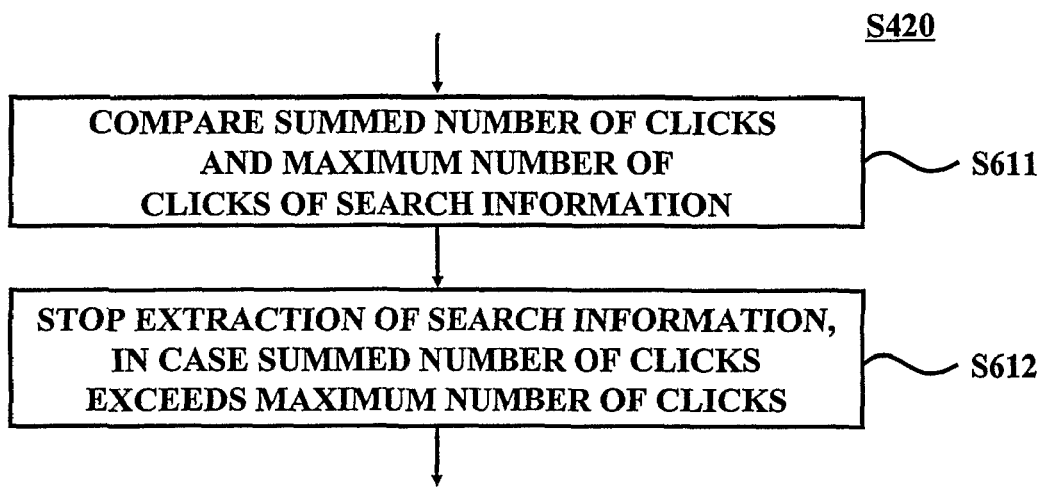
FIG. 11 is a flowchart illustrating an example of a method of controlling keyword advertising by setting the maximum number of clicks as a condition for terminating advertising according to the present invention.

FIG. 11 is a flowchart illustrating an example of a method of controlling keyword advertising by setting the maximum number of clicks as a condition for terminating advertising according to the present invention.

For this, the search information database 210 includes information on the maximum number of clicks allowed for each search information. In this instance, the maximum number of clicks is set by the advertiser 130 of the search information. Namely, the maximum number of clicks may be set by considering the estimated number of clicks needed to generate for a predetermined advertising period, or an amount of money the advertiser 130 can pay.

In step S611, the keyword advertising service system 200 sums up the number of clicks for each search information in accordance with generated clicks and compares the number of clicks to the maximum number of clicks of search information. The step S611 is a procedure for summing up the number of clicks for each search information whenever the user 120 selects search information provided to the user 120 as search results, and comparing the number of clicks to the maximum number of clicks. In the present embodiment, there is no particular constraint on the time period for summing up search information. However, only a click of the user 120 with respect to search information generated for a predetermined period, such as the advertising period, may be tallied.

In step S612, in the case the summed up number of clicks exceeds the maximum number of clicks, the keyword advertising service system 200 stops extraction of corresponding search information. The step S612 is a procedure for stopping keyword advertising of search information, in accordance with the arbitrary judgment of the advertiser 130 of search information that desired advertising outcomes have been achieved when the total number of clicks of the user 120 with respect to the search information reaches the maximum number of clicks.

Accordingly, the advertiser 130 may arbitrarily control the number of clicks for a particular search information within advertising strategies intended by the advertiser 130.

Figure 12:
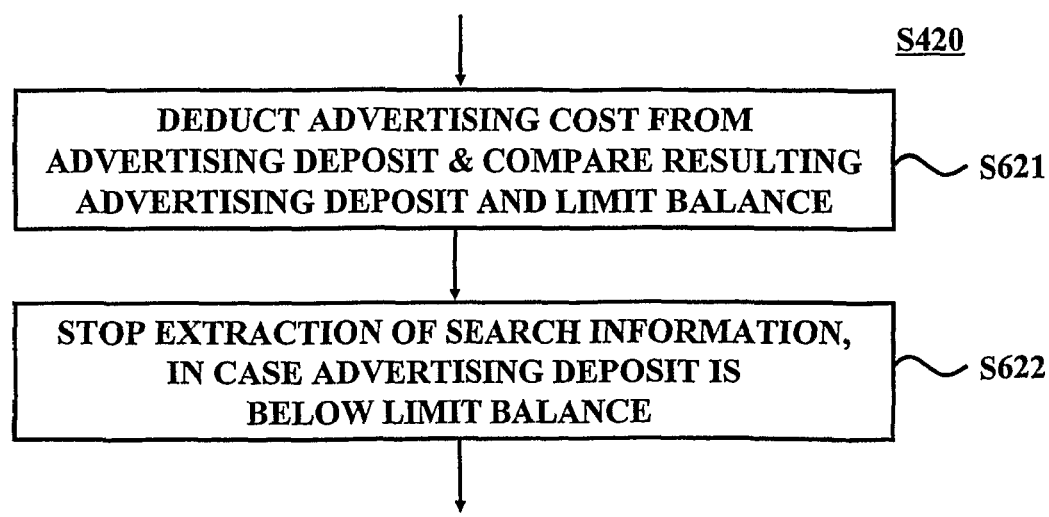
FIG. 12 is a flowchart illustrating an example of a method of controlling keyword advertising by setting advertising deposit and the limit balance as a condition for terminating advertising.

FIG. 12 is a flowchart illustrating an example of a method of controlling keyword advertising by setting an advertising deposit and limit balance as a condition for terminating advertising.

For this, the search information database 210 includes advertising deposit information for keyword advertising of search information. In this instance, the advertising deposit may be the balance of an advertiser's account from which advertising cost generated in accordance with the user's 120 click is deducted. In particular, a predetermined limit balance is set for the advertising deposit, and in the case the balance of an advertiser account drops to less than the limit balance, keyword advertising of corresponding search information is stopped. The limit balance may be dynamically determined by an operator of the present system on the basis of the mean of the number of clicks generating with respect to search information, the mean of advertising cost spent for a predetermined period, and the like.

In step S621, the keyword advertising service system 200 deducts the advertising cost from the advertising deposit and compares the resulting advertising deposit and the limit balance. The step S621 is a procedure for deducting advertising cost generating in accordance with a click of the user 120 with respect to search information from an advertiser account and checking whether the balance of the advertiser account drops to less than the limit balance.

In step S622, in the case the advertising deposit is less than the limit balance as a determined by the comparison, the keyword advertising service system 200 stops extraction of corresponding search information. The step S622 is a procedure for stopping keyword advertising of corresponding search information, by determining that it is impossible to continue keyword advertising because the balance of the advertiser account for corresponding search information drops to less than the limit balance.

Accordingly, according to the present invention, it is possible to enable an operator of the present system to charge the advertiser 130 for advertising cost according to keyword advertising.

Hereinafter, as another embodiment of the present invention, it will be described that a search result list is generated before a search request and provided as search results when the search request is received from a partner site.

Figure 13:
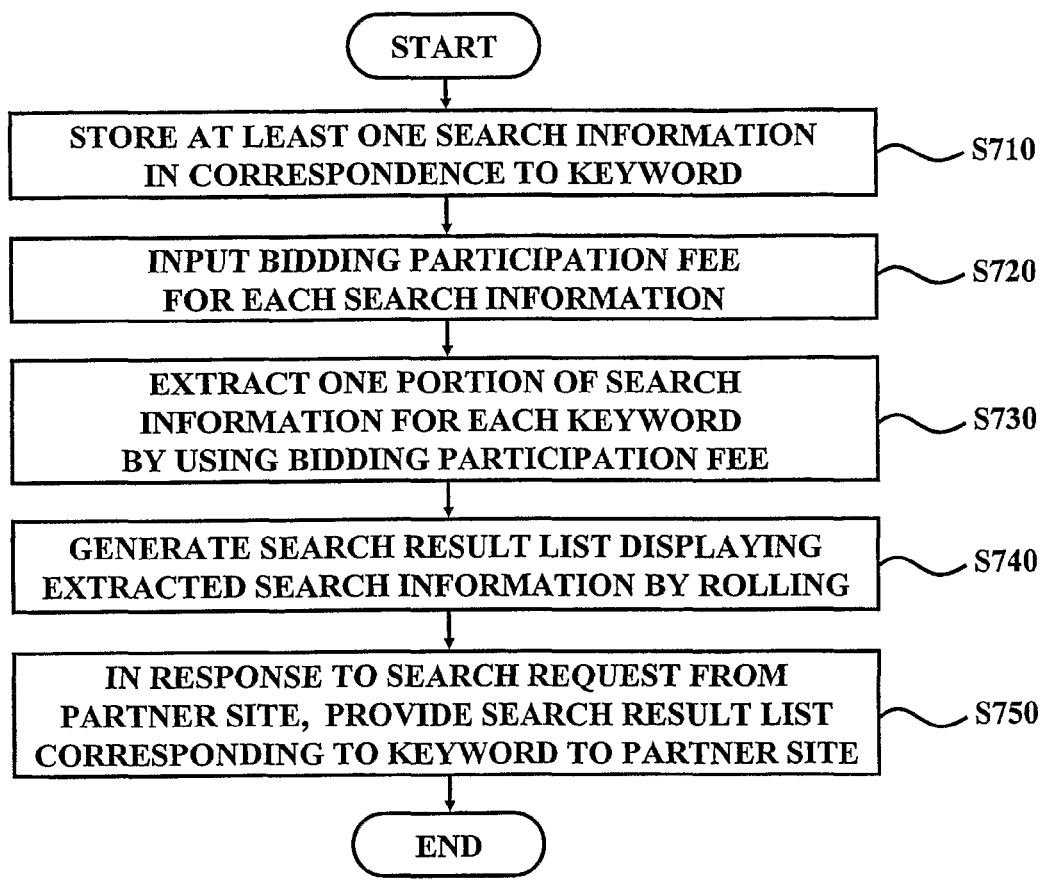
FIG. 13 is a flowchart illustrating a keyword advertising service method according to another embodiment of the present invention.

FIG. 13 is a flowchart illustrating a keyword advertising service method according to another embodiment of the present invention.

In step S710, the keyword advertising service system 200 maintains search information database 210 for storing at least one search information in correspondence to a predetermined keyword. In step S720, the keyword advertising service system 200 receives information on the bidding participation fee of each search information from the advertiser 130. The steps S710 and S720 are procedures similar to the step S410 of maintaining the search information database 210 and the step S521 of receiving the bidding participation fee. In this instance, the inputted bidding participation fee is stored and maintained in the search information database 210 to correlate to search information (see FIG. 3).

In step S730, the keyword advertising service system 200 extracts at least one portion of search information for each keyword by using the inputted bidding participation fee. In step S740, the keyword advertising service system 200 generates a search result list displaying the extracted search information by rolling and stores the generated search result list in the search information database 210 corresponding to a keyword. The steps S730 and S740 are procedures for extracting search information to be provided as search results with respect to each keyword and rolling the extracted search information to be displayed on a search result list. In this case, the rolling may be controlled to occur at a point in time when a search request is received from a partner site, at a point in time when search information to be extracted changes in accordance with a change of the bidding participation fee, or at a point in time when any one of search information displayed on a search result list satisfies a condition for terminating advertising. In this case, the satisfaction of the condition for terminating advertising includes at least one selected from the group consisting of: the expiration of a predetermined advertising period for the search information; the number of clicks summed up for the advertising period exceeding a predetermined maximum number of clicks; and the advertising deposit reaching the limit balance. Namely, in the present embodiment, the rolling may occur frequently, in the case search information displayed on a search result list changes or in the case a search request is received from a partner site.

In step S750, the keyword advertising service system 200 receives a search request including a keyword inputted in the selected partner site 110, from the partner site 110 and in response to the search request, provides a search result list corresponding to the inputted keyword to the partner site 110. The step S750 is a procedure for identifying a related search result list from the search information database 210 on the basis of a keyword inputted in a partner site by the user 120 for a search request. In the step S750, the search result list is provided as search results to the partner site 110 and displayed on the terminal 125 of the user 120 who is accessing the partner site 110 (see FIGS. 4 and 5).

Thus, according to the present invention, since a pre-generated search result list is provided as search results of each partner site, it is possible to save system resources occurring by generating a search result list whenever a search request is received.

The embodiments of the present invention include computer readable media including program instructions to implement various operations embodied by a computer: The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 14:
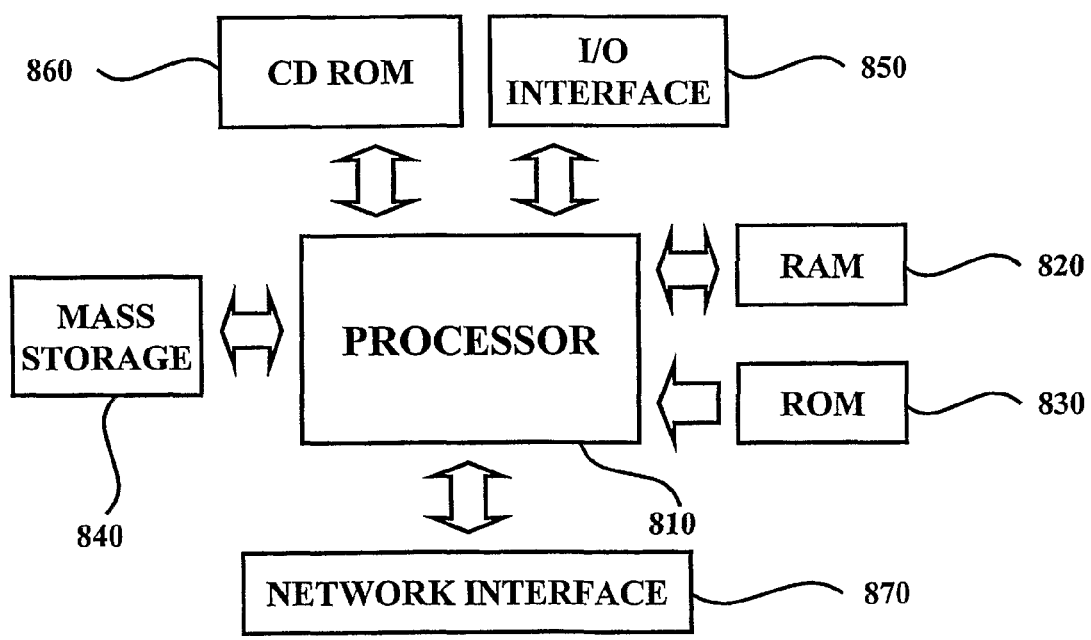
FIG. 14 is a block diagram illustrating the inside of a general use computer apparatus that may be employed in implementing the keyword advertising service method according to the present invention.

FIG. 14 is a block diagram illustrating the inside of a general use computer apparatus that may be employed in implementing the keyword advertising service method according to the present invention FIG. 14 is a block diagram illustrating a computer apparatus 800 which includes at least one processor 810 connected to a main memory device including RAM (Random Access Memory) 820 and ROM (Read Only Memory) 830. The processor 810 is also known as a central processing unit (CPU). As well-known in the field of the art, the ROM 830 unidirectionally transmits data and instructions to the CPU, and the RAM 820 is generally used for bidirectionally transmitting data and instructions. The RAM 820 and the ROM 830 may include a certain proper form of a computer readable recording medium. A mass storage device 840 is bidirectionally connected to the processor 810 to provide additional data storage capacity and may be one of number of computer readable recording mediums. The mass storage device 840 is used for storing programs and data and is an auxiliary memory. A particular mass storage device such as a CD ROM 860 may be used. The processor 810 is connected to at least one input/output interface 850 such as a video monitor, a track ball, a mouse, a keyboard, a microphone, a touch-screen type display, a card reader, a magnetic or paper tape reader, a voice or hand-writing recognizer, a joy stick, or other known computer input/output unit. The processor 810 may be connected to a wired or wireless communication network via a network interface 870. The procedure of the described method can be performed via the network connection. The described devices and tools are well-known to those skilled in the art of computer hardware and software.

The described hardware devices may be configured to act as one or more software modules in order to perform the operations of the present invention.

While this invention has been particularly shown and described with reference to preferred embodiments thereof, various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

As used in this application, the term "unit" is intended to refer to, but is not limited to, a software or hardware component, which performs certain tasks. A unit or component may advantageously be configured to reside on the addressable storage medium and configured to execute on one or more processors. Thus, a unit or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

According to the present invention, there is provided keyword advertising service method and system which fairly assigns advertising outcomes to each search information and systematically manages advertising by determining, in response to a search request from a plurality of partner sites, a display position of extracted search information by rolling and providing the same to the partners sites.

Also, according to the present invention, there is provided keyword advertising method and system which specifies a partner site to display search information in accordance with the arbitrary judgment of an advertiser and reduces unnecessary advertising cost by performing keyword advertising only in a partner site needed for advertising.

Also, according to the present invention, there is provided keyword advertising method and system which can stop an excessive competition between advertisers by randomly sorting extracted search information through rolling, and calculate reasonable advertising cost by making advertising cost of all search information all the same in a search result list, irrespective of its display position.

Also, according to the present invention, there is provided keyword advertising method and system which prevents a display position of extracted search information from being monopolized by particular search information by controlling a display position of the search information according to a search request from a partner site not to be consecutively determined.

The invention claimed is:

1. A keyword advertising service method for providing search information in response to a search request, the method using a server including a processor performing the steps of:
providing an advertiser with a list of a plurality of partner sites;
receiving a selection signal for one or more partner sites included in the list from the advertiser;
receiving ads information and a bid price for a keyword for each of said selected one or more partner sites from the advertiser;
associating said received ads information with the keyword;
storing said bid price and ads information in association with said selected one or more partner sites in a search information database;
receiving a search request including a keyword inputted in a partner site selected by a user, from the partner site;
extracting a predetermined number of ads information corresponding to said inputted keyword based on the bid price from the search information database only if the partner site selected by the user is one of said selected one or more partner sites;
randomly ordering the extracted predetermined number of ads information, independently from the bid price, for a search result list in response to the search request;
providing the search result list to the partner site in response to the search request so that the partner site displays said randomly ordered ads;
determining a same rate based on the lowest bid price among the advertisers whose ads have been extracted for the search result list wherein at least two of the extracted ads have different bid prices;
calculating advertising cost for the extracted predetermined number of ads based on the same rate independent of the respective advertisers' actual bid prices and positions of the ads in the search result list; and
generating information on advertising cost charged to the advertiser on the basis of a click on said randomly ordered ads.

2. The method of claim 1, wherein a predetermined number of advertisers' ads corresponding to said inputted keyword are extracted based on ranking of the bid price.

3. The method of claim 1, wherein:
the search information database further includes information on the maximum number of clicks allowed for the extracted at least one ads information; and
the step of extracting at least one at least one ads information corresponding to the inputted keyword comprises the steps of:
summing up a number of clicks for each ads information;
comparing the number of clicks counted and the maximum number of clicks of the corresponding ads information; and
stopping the extraction of the corresponding ads information, in the case the number of clicks counted exceeds the maximum number of clicks.

4. The method of claim 1, wherein:
the search information database includes information on advertising deposit for keyword advertising of the ads information, and the step of extracting at least one ads information corresponding to the inputted keyword comprises the steps of:
deducting generated advertising cost from the advertising deposit according to generation of the click;
comparing the subtracted advertising deposit and a predetermined limit balance; and
stopping the extraction of the corresponding ads information in the case the advertising cost is more than the limit balance.

5. A keyword advertising service method for providing search information in response to a search request, the method using a server including a processor performing the steps of:

providing an advertiser with a list of a plurality of partner sites;

receiving a selection signal for one or more partner sites included in the list from the advertiser;

receiving ads information and a bid price for a keyword for each of said selected one or more partner sites from the advertiser;

associating said received ads information with the keyword;

storing said bid price and ads information in association with said selected one or more partner sites in a search information database;

receiving a search request including a keyword inputted in a partner site selected by a user, from the partner site;

extracting a predetermined number of ads information corresponding to said inputted keyword based on the bid price from the search information database only if the partner site selected by the user is one of said selected one or more partner sites;

randomly ordering the extracted at least one ads information, independently from the bid price, for a search result list in response to the search request;

providing the search result list to the partner site in response to the search request so that the partner site displays said randomly ordered ads;

determining a same rate based on the lowest bid price among the advertisers whose ads have been extracted for the search result list wherein at least two of the extracted ads have different bid prices;

calculating advertising cost for the extracted predetermined number of ads based on the same rate independent of the respective advertisers' actual bid prices and positions of the ads in the search result list; and generating information on advertising cost charged to the advertiser on the basis of a click on said randomly ordered ads.

6. One or more storage media having stored thereon a computer program that, when executed by one or more processors, causes the one or more processors to perform acts including:

providing an advertiser with a list of a plurality of partner sites;

receiving a selection signal for one or more partner sites included in the list from the advertiser;

receiving ads information and a bid price for a keyword for each of said selected one or more partner sites from the advertiser;

associating said received ads information with the keyword;

storing said bid price and ads information in association with said selected one or more partner sites in a search information database;

receiving a search request including a keyword inputted in a partner site selected by a user, from the partner site;

extracting a predetermined number of ads information corresponding to said inputted keyword based on the bid price from the search information database only if the partner site selected by the user is one of said selected one or more partner sites;

a processor randomly ordering the extracted predetermined number of ads information, independently from the bid price, for a search result list in response to the search request;

providing the search result list to the partner site in response to the search request so that the partner site displays said randomly ordered ads;

determining a same rate based on the lowest bid price among the advertisers whose ads have been extracted for the search result list wherein at least two of the extracted ads have different bid prices;

calculating advertising cost for the extracted predetermined number of ads based on the same rate independent of the respective advertisers' actual bid prices and positions of the ads in the search result list; and generating information on advertising cost charged to the advertiser on the basis of a click on said randomly ordered ads.

* * * * *